United States Patent
Barton

(10) Patent No.: US 10,430,036 B2
(45) Date of Patent: Oct. 1, 2019

(54) REMOTELY CONFIGURING WINDOWS DISPLAYED ON A DISPLAY DEVICE

(71) Applicant: TiVo Solutions Inc., San Carlos, CA (US)

(72) Inventor: James M. Barton, Los Gatos, CA (US)

(73) Assignee: TiVo Solutions Inc., San Jose, CA (US)

( * ) Notice: Subject to any disclaimer, the term of this patent is extended or adjusted under 35 U.S.C. 154(b) by 757 days.

(21) Appl. No.: 13/801,927

(22) Filed: Mar. 13, 2013

(65) Prior Publication Data

US 2013/0246969 A1   Sep. 19, 2013

Related U.S. Application Data

(60) Provisional application No. 61/610,959, filed on Mar. 14, 2012.

(51) Int. Cl.
*G06F 3/048* (2013.01)
*G06F 3/0484* (2013.01)
*G06F 3/0488* (2013.01)
*G06F 3/14* (2006.01)
*G06F 9/451* (2018.01)
*G09G 5/14* (2006.01)

(52) U.S. Cl.
CPC ............ *G06F 3/0484* (2013.01); *G06F 3/048* (2013.01); *G06F 3/04883* (2013.01); *G06F 3/1462* (2013.01); *G06F 9/452* (2018.02); *G09G 5/14* (2013.01)

(58) Field of Classification Search
CPC ....................................................... G06F 3/048
See application file for complete search history.

(56) References Cited

U.S. PATENT DOCUMENTS

| 5,651,107 | A | * | 7/1997 | Frank | ..................... | G06F 3/0481 345/589 |
| 5,832,505 | A | * | 11/1998 | Kasso | ................. | G06F 9/44505 |
| 5,867,156 | A | * | 2/1999 | Beard | .................. | G06F 3/0481 715/753 |
| 6,429,883 | B1 | * | 8/2002 | Plow | ..................... | G06F 3/0481 715/768 |

(Continued)

FOREIGN PATENT DOCUMENTS

| JP | 2005-242074 | 9/2005 |
| JP | 2008-054499 | 3/2008 |

(Continued)

OTHER PUBLICATIONS

Levine et al., "The Internet for Dummies" 12th Edition, 2010, Wiley Publishing, Inc.*

(Continued)

*Primary Examiner* — Ryan Barrett
(74) *Attorney, Agent, or Firm* — Haley Guiliano LLP

(57) ABSTRACT

One or more window characteristics of at least one window displayed on a primary display device are displayed at a remote display device. User input is received at the remote display device to modify the one or more window characteristics of the at least one window displayed on the primary display device. The one or more modified window characteristics for the at least one window displayed on the primary display device are transmitted from the remote display device to the primary display device.

15 Claims, 9 Drawing Sheets

(56) References Cited

U.S. PATENT DOCUMENTS

| | | | | |
|---|---|---|---|---|
| 6,466,654 | B1* | 10/2002 | Cooper | G10L 13/00 379/88.01 |
| 7,870,496 | B1* | 1/2011 | Sherwani | H04L 67/38 715/718 |
| 8,225,191 | B1* | 7/2012 | Kalman | G06F 17/30873 707/620 |
| 8,736,773 | B1* | 5/2014 | Fan | H04N 5/44 345/156 |
| 8,773,591 | B1* | 7/2014 | Fan | H04N 5/44 348/563 |
| 9,099,031 | B2* | 8/2015 | Chen | G06F 17/211 |
| 9,485,290 | B1* | 11/2016 | Kolomeitsev | H04L 65/60 |
| 2003/0142108 | A1* | 7/2003 | Brown | G06F 3/0481 345/589 |
| 2003/0142139 | A1* | 7/2003 | Brown | G06F 3/0481 715/800 |
| 2003/0210285 | A1* | 11/2003 | Numano | G06F 1/1616 715/856 |
| 2004/0128353 | A1* | 7/2004 | Goodman | H04L 51/04 709/204 |
| 2005/0039133 | A1* | 2/2005 | Wells | G06Q 10/10 715/740 |
| 2006/0288306 | A1 | 12/2006 | Mahajan et al. | |
| 2007/0217518 | A1* | 9/2007 | Valmiki | G06T 9/007 375/240.24 |
| 2008/0122847 | A1* | 5/2008 | Takano | G06T 3/4092 345/428 |
| 2008/0288876 | A1* | 11/2008 | Fleming | G06F 3/167 715/761 |
| 2009/0187841 | A1* | 7/2009 | Chaudhri | G06F 3/0481 715/767 |
| 2009/0262084 | A1* | 10/2009 | Yu | G06F 1/14 345/173 |
| 2010/0169790 | A1* | 7/2010 | Vaughan | G06F 3/0481 715/740 |
| 2011/0109547 | A1* | 5/2011 | Lin | G06F 3/048 345/158 |
| 2011/0138314 | A1* | 6/2011 | Mir | G06F 9/4445 715/779 |
| 2011/0157014 | A1 | 6/2011 | Hachiya et al. | |
| 2011/0219331 | A1* | 9/2011 | DeLuca | G06F 3/048 715/799 |
| 2011/0225553 | A1 | 9/2011 | Abramson et al. | |
| 2011/0246904 | A1 | 10/2011 | Pinto et al. | |
| 2011/0252318 | A1* | 10/2011 | Helms | G06F 9/4443 715/702 |
| 2012/0086247 | A1* | 4/2012 | Liu | B60N 2/4876 297/217.3 |
| 2012/0162536 | A1* | 6/2012 | Sibilsky | G06F 3/033 348/734 |
| 2013/0104065 | A1* | 4/2013 | Stecher | G06F 3/0481 715/767 |
| 2013/0307796 | A1* | 11/2013 | Liu | G06F 3/041 345/173 |
| 2014/0095000 | A1* | 4/2014 | Waller | B60K 37/06 701/2 |
| 2014/0320744 | A1* | 10/2014 | Fan | H04N 5/44 348/563 |
| 2015/0130727 | A1* | 5/2015 | Kim | G06F 3/0416 345/173 |
| 2015/0181278 | A1* | 6/2015 | Yoon | H04N 21/42218 725/37 |
| 2018/0139405 | A1* | 5/2018 | Baek | H04N 5/44 |

FOREIGN PATENT DOCUMENTS

| | | |
|---|---|---|
| JP | 2008-544399 | 12/2008 |
| JP | 2009-289182 | 12/2009 |
| JP | 2010-224872 | 10/2010 |

OTHER PUBLICATIONS

European Patent Office, "Search Report" in application No. PCT/US13/31807, dated Jun. 10, 2013, 12 pages.

Current Claims in application No. PCT/US13/31807, dated Jun. 2013, 6 pages.

European Patent Office, Application No. 13761857.5, Extended European Search Report dated Oct. 13, 2015.

European Patent Office, Application No. 13761857.5, Pending Claims as of Oct. 13, 2015

Japanese Patent Office, Application No. 2015-500638, Foreign Office Action dated Jan. 26, 2016.

Japanese Patent Office, Application No. 2015-500638, Pending Claims as of Jan. 26, 2016.

Chinese Patent Office, Application No. 201380025470.7, Foreign Office Action dated Jun. 13, 2016.

Chinese Patent Office, Application No. 201380025470.7, Pending Claims as of Jun. 13, 2016.

Japanese Patent Office, Application No. 2015-500638, Foreign Office Action dated Aug. 23, 2016.

Japanese Patent Office, Application No. 2015-500638, Pending Claims as of Aug. 23, 2016.

* cited by examiner

REMOTELY CONFIGURING WINDOWS DISPLAYED ON A DISPLAY DEVICE

CROSS REFERENCE TO RELATED APPLICATIONS

This application Claims benefit of U.S. Patent Application Ser. No. 61/610,959, filed Mar. 14, 2012, the entire contents of which are incorporated herein by reference. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates to remotely configuring windows displayed on a primary display device. Specifically, the invention relates to a remote display device that modifies window characteristics of windows displayed on a primary display device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general user interface systems found in televisions, laptops, tablets, phones, kiosks, or most other devices typically include a display interface which can display multiple windows. Each displayed window may include content from a corresponding application running on the system. For example, one window may display a web browser while a second window may display a desktop application.

The windows displayed on the single display interface may be modified by a user submitting input on that display interface. For example, a user may select a window being displayed and move the window to a different part of the display interface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
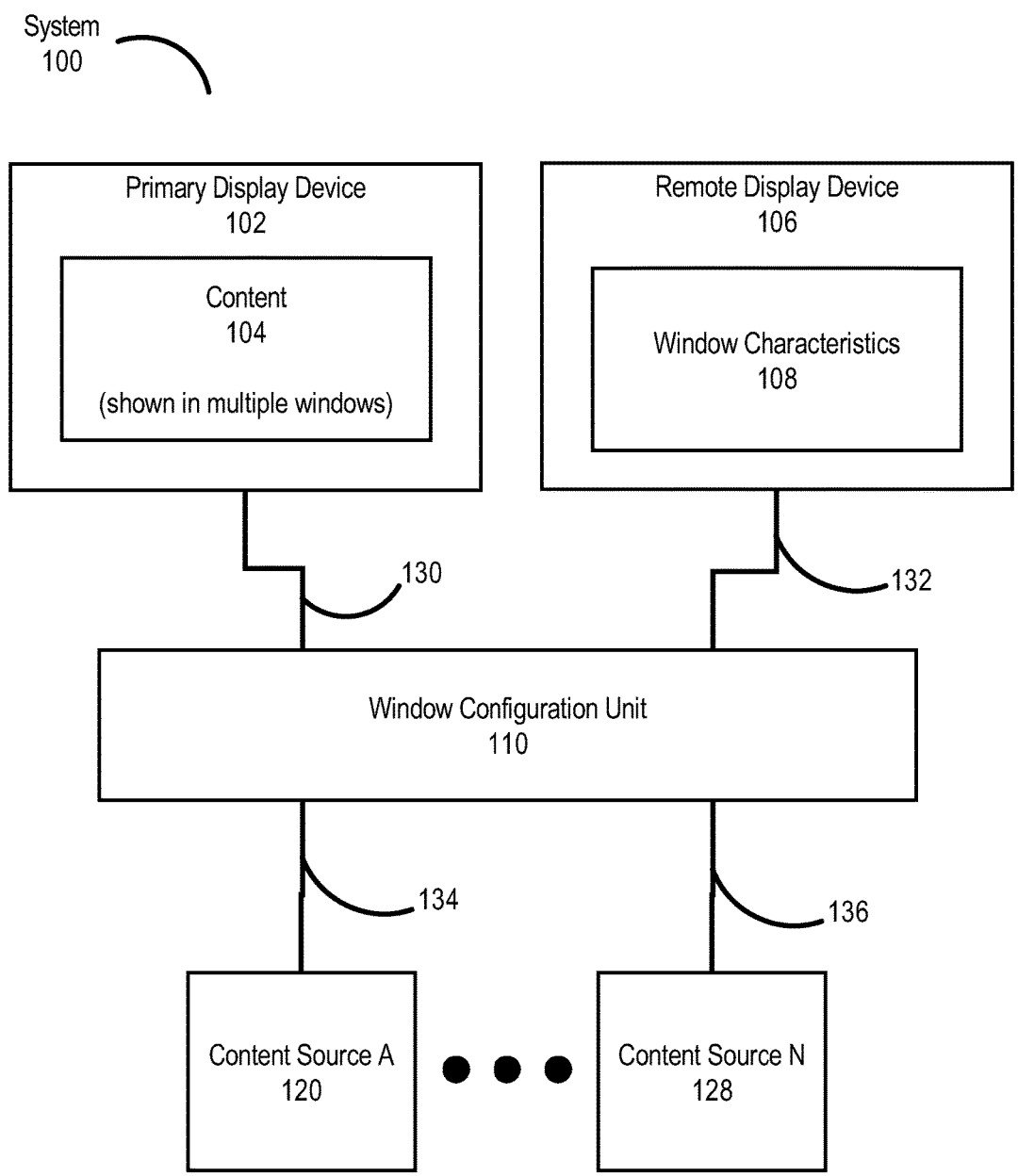
FIG. 1 is a block diagram illustrating an example system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
    2.0 SYSTEM ARCHITECTURE
    3.0 CONFIGURING A WINDOW
    4.0 WINDOW CONFIGURATION EXAMPLES
    5.0 EXAMPLE EMBODIMENTS
    6.0 HARDWARE OVERVIEW
    7.0 EXTENSIONS AND ALTERNATIVES 1.0 Functional Overview In an embodiment, one or more windows that are displayed on a primary display device are associated with window characteristics. Examples of window characteristics include, but are not limited to, any combination of: a window display position, a window size, a window transparency level, a window display layer, color, contrast, brightness, etc. Window characteristics may include audio information associated with content displayed within a window.

In an embodiment, one or more windows are displayed on a primary display device concurrently with a display of corresponding window characteristics on a remote display device. The window characteristics may be displayed in one or more formats (for example, textual format, graphical format, both, etc.) on the remote display device. In an example, a display of the window characteristics on the remote display device includes a list of windows displayed on the primary display device with the corresponding characteristics. In another example, a display of the window characteristics on the remote display device includes a visual representation of the windows being displayed on the primary display device.

In an embodiment, the remote display device may be used to modify the window characteristics of windows displayed on, or by, the primary display device. In an example, the remote display device receives user input comprising new values for window characteristics of one or more windows displayed on the primary display device.

In an embodiment, in response to any modifications of the window characteristics on the remote display device, the display of windows on the primary display device may be updated by the primary display device. For example, a display of the windows on the primary display device may be updated based on new values for window characteristics received at the remote display device and communicated to the primary display device.

2.0 System Architecture

Although a specific computer architecture is described herein, other embodiments of the invention are applicable to any architecture that can be used to perform the functions described herein.

FIG. 1 illustrates a system (100) in accordance with an embodiment. Although a specific system is described, other embodiments are applicable to any system that can be used to perform the functionality described herein. Components of the system (100) may be connected by, for example, a Local Area Network (LAN), Wide Area Network (WAN), wireless network, the Internet, Intranet, Extranet, etc. In an embodiment, links 130, 132, 134, and 136 may each comprise a network link or cable. Alternatively or additionally, any number of devices within the system (100) may be directly connected to each other through wired or wireless communication segments.

In an embodiment, the system (100) includes one or more display devices (for example, primary display device (102) and remote display device (106)), one or more window configuration units (for example, window configuration unit (110)), and one or more content sources (for example, content source A (120) and content source N (128)). One or more components described within system (100) may be combined together in a single device. For example, a gaming console may function both as a content source and a window configuration unit (110), a primary display device (102) may function both as a primary display device and a window configuration unit (110), etc.

Each of these components are presented to clarify the functionalities described herein and may not be necessary to implement the invention. Furthermore, components not shown in FIG. 1 may also be used to perform the functionalities described herein. Functionalities described as performed by one component may instead be performed by another component.

In an embodiment, the primary display device (102) generally represents any device that is configured to display content (104). Examples of a primary display device include, but are not limited to, any of: a television, a monitor, a laptop, a tablet, a kiosk, a cellular phone, a handheld gaming console, etc. A primary display device (102) may include multiple components, e.g., a screen, a projector, etc.

Figure 3A:
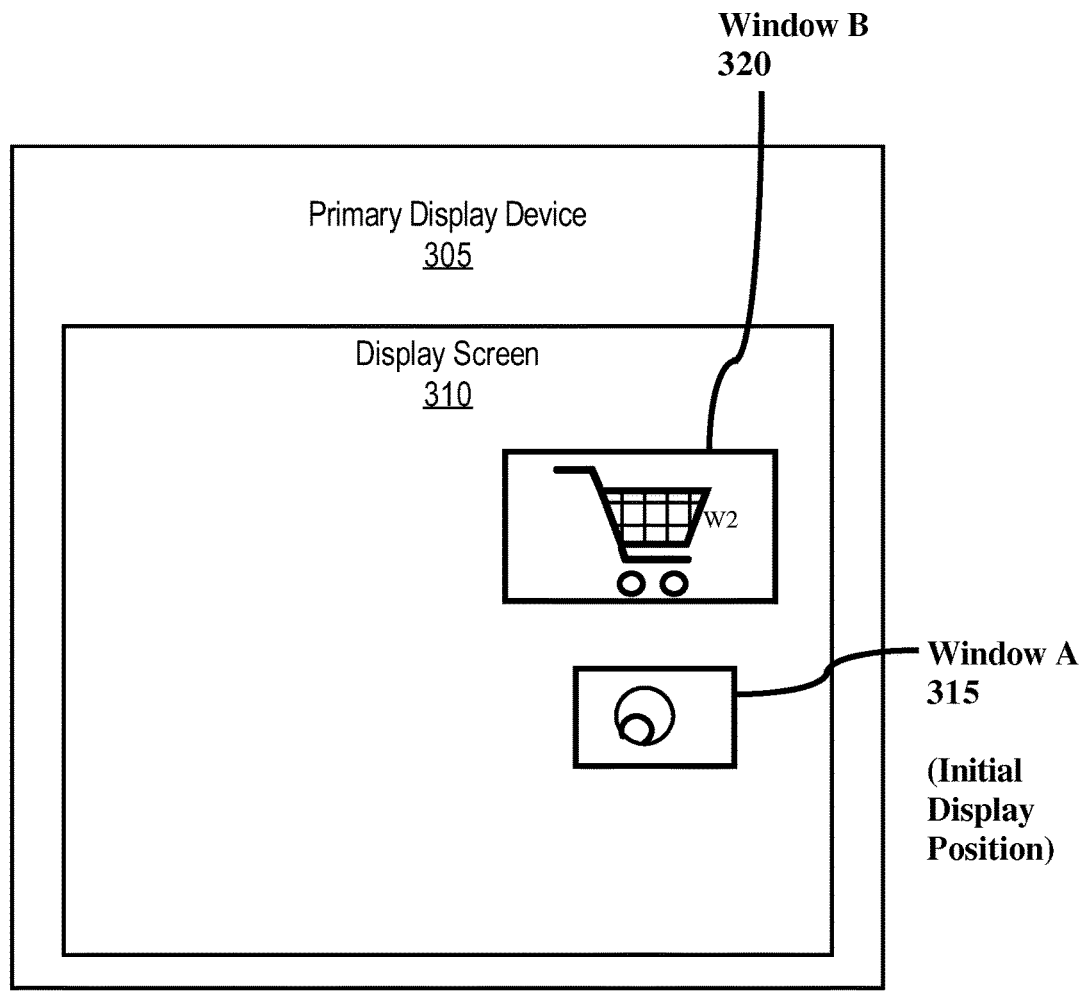
FIGS. 3A-3C illustrate an example of remotely configuring windows in accordance with one or more embodiments.
Figure 3B:
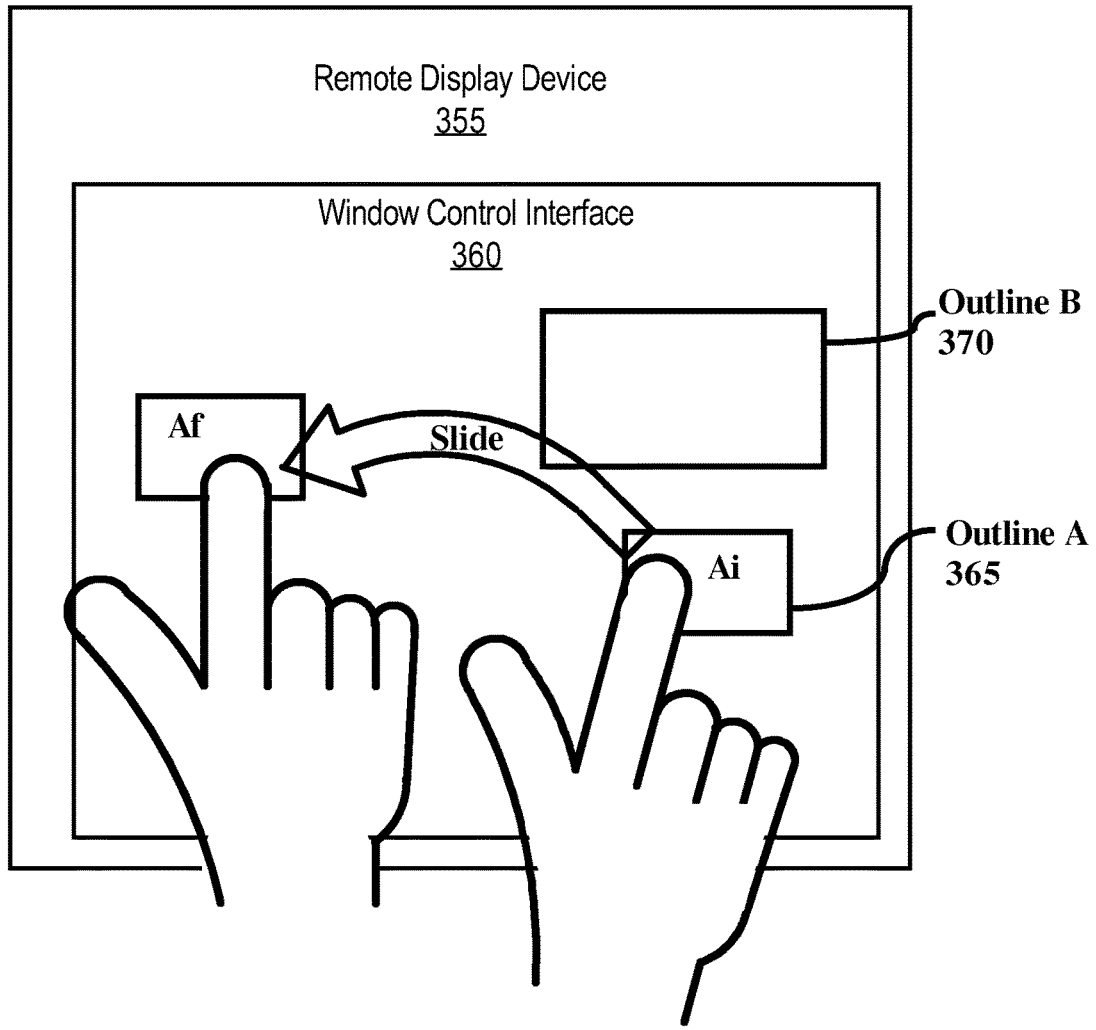

In an embodiment, the primary display device (102) may be configured to display the content (104) within one or more windows of a graphical user interface (GUI). A window refers to a portion of a screen displayed on, or by, the primary display device (102). The portion of the screen included within a window may be defined by a boundary along the perimeter of the window. Examples of windows (window A (315) and window B (320)) are shown in FIG. 3A. A window may be of a square, rectangular, circular, or other shape. A window may include content (104) from one or more content sources. Examples of content (104) include, but are not limited to, any combination of: multimedia content, video, text, images, web content, etc. A window may include content (104) received in a content stream (for example, a broadcasted multimedia channel from a broadcast service or a video downloaded from a web server). A window may include content from a video conference/chat application (for example, video of a user, group of users, etc.).

In an embodiment, content displayed within a window may be associated with an audio track. For example, a music video displayed within a window may be associated with a corresponding song.

In an embodiment, multiple windows displayed on the primary display device (102) may include different content, different types of content, related content, or unrelated content. In an example, the primary display device (102) may correspond to a television screen that is configured to display a live sports broadcast in one window, data being read from a digital video disc in a second window, a video conference/chat application in a third window, a web browser application in a fourth window, and contents of a directory in a fifth window.

In an embodiment, each window displayed by the primary display device (102) is associated with corresponding window characteristics (108) which may be controlled by a remote display device (106). A remote display device (106) generally represents any device that includes one or more components configured to receive user input for configuring window characteristics (108) of one or more windows displayed on the primary display device (102). Examples of a remote display device (106) include, but are not limited to, any of: a laptop, portable hand-held devices (e.g., a touch-screen tablet, a cellular phone, a handheld gaming console, a smart phone, etc.), a desktop computer, etc.

In an embodiment, a program installed on the remote display device (106) may be used to perform the functions described herein. For example, a mobile application may be downloaded onto a remote display device (106) that is a touch-screen tablet. The mobile application may use an application programming interface (API) to communicate with the other components within the system (100). For example, the mobile application may use a command from the API to request current window characteristics (108) for windows displayed on the primary display device (102) or send updated window characteristics (108) to the window configuration unit (110).

In an embodiment, window characteristics (108), which include any information related to a window, may be displayed in one or more formats (for example, textual format, graphical format, both, etc.) on the remote display device (106). In an example, a display on the remote display device (106) includes a list of windows displayed on the primary display device (102) with corresponding window characteristics (108). In another example, the window characteristics (108), displayed on the remote display device, include visual representations of the windows being displayed on the primary display device. A visual representation may include a shape of a window or a thumbnail representing a window. A visual representation of a window may include the same content as the window itself or the same content in a lower resolution.

In an embodiment, window characteristics for a window may include characteristics that are related to the display of the window. For example, a window characteristic may include a display position or size of a window displayed on the primary display device (102). Values indicating the display position or size may include one or more sets of x and y coordinates (for example, coordinates of a top left corner of the window or center of the window). Values indicating the size may include the measurement of a diagonal across the window.

In an embodiment, configuring the display position of a window displayed on the primary display device (102) may include selecting a new display position of the window using the remote display device (106). For example, the x and y coordinates of the new display position may be entered into a form or entry area using a keypad on the remote display device (106).

In an example, a visual representation, corresponding to a particular window on the primary display device (102), may be displayed on the remote display device (106). A user may touch the visual representation displayed on a remote display device (106) with a finger and move the finger along the display screen of the remote display device (106) to move the visual representation. In response to the action by the user on the remote display device (106), the corresponding window displayed on the primary display device (102) may be repositioned, as described below with reference to FIG. 2A.

In an embodiment, repositioning the corresponding window on the primary display device (102) may include showing movement of the window on the primary display device (102). For example, the window may be progressively displayed at intermediate positions between a start position and an end position. In a different example, repositioning the corresponding window on the primary display device (102) may include displaying the corresponding window at the start position and then the end position without displaying the window at any intermediate positions.

In an embodiment, configuring the size of a window displayed on the primary display device (102) may include selecting a new size of the window using the remote display device (106). For example, a visual representation, corresponding to a window displayed on the primary display device (102), may be displayed on the remote display device (106). The visual representation may be stretched or shrunken by a user touching a touch screen interface on the remote display device (106). For example, a user may pinch a touch screen interface of a touch-screen tablet displaying a visual representation that corresponds to a window displayed on a television. The pinch on the touch screen interface of the touch-screen tablet results in shrinking the visual representation to a new smaller size.

In another example, a user may enter text comprising a window size into a field displayed on the remote display device (106). Based on the window size submitted on the remote display device (106), the display of a window on the primary display device (102) is updated, as described below with reference to FIG. 2A.

In an embodiment, window characteristics may include a transparency level associated with a window displayed on the primary display device (102). The transparency level for a particular window determines whether other windows (or other content) behind the particular window are visible. If the transparency level is low, other windows behind the particular window may not be visible. If the transparency level is high, other windows behind the particular window may be at least partially visible. Configuring the transparency of a window displayed on the primary display device (102) may include selecting a new transparency level of the window using the remote display device (106). For example, user-selectable positions on a sliding bar displayed on the remote display device (106) may correspond to different transparency levels for a window displayed on the primary display device (102). Based on the transparency level selected on the remote display device (106), the display of the corresponding window on the primary display device (102) is updated, as described below with reference to FIG. 2A.

In an embodiment, window characteristics may include a window display layer of a window displayed on the primary display device (102). An appearance of a window on the primary display device (102) is selected based on the display layer associated with the window. For example, a particular window may appear to be in front of other windows or behind other windows based on the display layer of the particular window. If a particular window is positioned to appear behind other windows, a portion of the particular window may be visible or no portion of the particular window may be visible on the primary display device (102).

In an embodiment, configuring a display layer of a window displayed on the primary display device (102) may include selecting the display layer of the window using the remote display device (106). For example, visual representations, of windows displayed on the primary display device (102), may be displayed on the remote display device (106). The visual representation, corresponding to a particular window, may be moved in front of or behind other visual representations corresponding to other windows. Based on the selected display layer for the visual representation displayed on the remote display device (106), the display of the corresponding window on the primary display device (102) is updated, as described below with reference to FIG. 2A.

In an embodiment, window characteristics (108) may include audio information associated with content displayed within a window. For example, the window characteristics (108) for a particular window may include an audio track for a video that is streamed within the particular window. Configuring the audio information may include playing or muting the audio information using the remote display device (106). In an example, the primary display device (102) may concurrently display two windows with different content, where content in each window is associated with a corresponding audio track. The remote display device (106) may be used to select an active window of the windows displayed on the primary display device (102). Selection of the active window on the remote display device (106) may result in selecting and playing audio content corresponding to content in the active window. The selected audio content may be played by the remote display device (106), the primary display device (102), or another device within the system.

In an embodiment, the content sources (for example, content source A (120) and content source N (128)) may include devices or applications that provide audio and/or visual content (104) for displaying or playing on the primary display device (102) and/or the remote display device (106). Examples of content sources may include a Digital Video Disc player that reads data from a Digital Video Disc (DVD) or a digital video recorder (DVR). Other examples of content sources include, but are not limited to, any of: a set-top box, a computer system, a gaming console, a media device, a local server, a web server, a data repository, a kiosk, a mobile device, a network server, a mobile application, a web application, a desktop application, etc.

In an embodiment, the window configuration unit (110) comprises firmware, hardware, software, or a combination thereof in various embodiments that can implement the functions described herein. In an embodiment, the window configuration unit (110) configures one or more windows on the primary display device (102) for displaying content (104). For example, the window configuration unit (110) may concurrently configure a first window for displaying content from a web browser application and a second window for displaying content from a desktop application. The window configuration unit (110) may obtain content from different content sources to display onto the primary display device (102) within respective windows.

In an embodiment, the window configuration unit (110) configures one or more window characteristics (108) for windows displayed on the primary display device (102). The window configuration unit (110) may receive a selection of window characteristics (108) from the remote display device (106) and configure windows displayed on the primary display device (102) based on the window characteristics (108). In an example, the window configuration unit (110) determines a size and display location of a window displayed on the primary display device (102) based on user selections received from the remote display device (106).

In an embodiment, the window configuration unit (110) may write data, to a buffer (for example, frame buffer, video buffer, etc.), that includes content (104) of a screen image that is to be displayed on the primary display device (102). The organization of the content (104) in the screen image is based on window characteristics (108) of the windows. For example, the organization of the windows displayed on the primary display device (102) may be based on one or more of: position, size, transparency, display layer, etc., that are associated with the windows and that are received from the remote display device (106).

In an embodiment, the window configuration unit (110) may include one or more components for receiving and/or transmitting content (104), window characteristics (108), etc. For example, the window configuration unit (110) may include any combination of: a network interface card, a tuner, a compressor, a decompressor, an encoder, a decoder, a modem, an encryption device, a decryption device, a multiplexer, a demultiplexer, a receiver, or any component involved in receiving or transmitting data. In an embodiment, the window configuration unit (110) may receive and/or transmit content over wired and/or wireless segments. For example, the window configuration unit (110) may receive content on a broadcast stream, a network stream (e.g., Internet, intranet, local area network, etc.), a Bluetooth signal, a wireless signal, an infrared signal, any suitable frequency in the electro-magnetic spectrum and/or via any other accessible method of receiving content from or transmitting content to devices within the system (100) or outside of the system (100).

In an embodiment, the window configuration unit (110) comprises an encoder and/or decoder which may be configured for encoding or decoding data in real time. In an example, window configuration unit (110) may be configured to encode data sent to the remote display device (106) and decode data received from the remote display device (106). In an example, the window configuration unit (110) may concurrently write a first copy of data to a frame buffer for displaying on the primary display device (102) and encode a second copy of the data for transmission to the remote display device (106). The window configuration unit (110 may compress data sent to the remote display device (106) using lossless or lossy compression techniques.

3.0 Configuring a Window

Figure 2A:
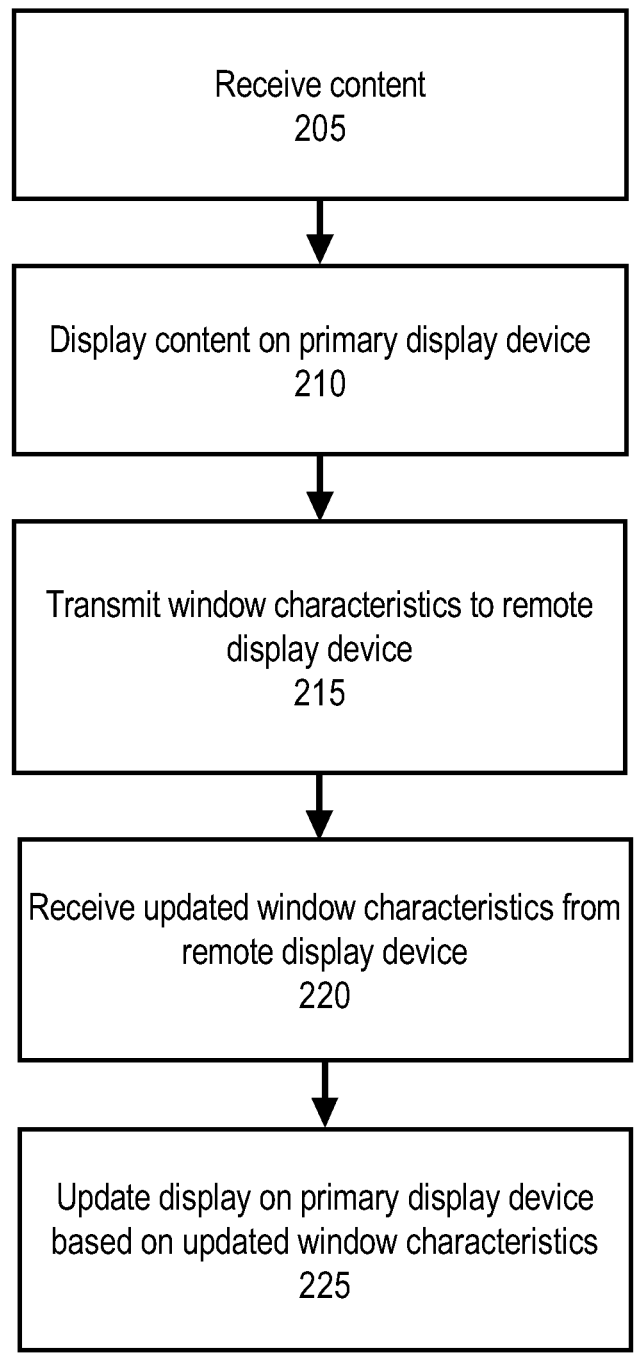
FIGS. 2A-2B illustrate a flow chart for configuring windows displayed on a primary display device in accordance with one or more embodiments.

FIG. 2A illustrates an example flow chart for configuring windows displayed on the primary display device. Steps shown in FIG. 2A may be rearranged or omitted. Furthermore, additional steps not shown in FIG. 2A may be performed in accordance with one or more embodiments. Accordingly, the selection or arrangement of steps shown in FIG. 2A should not be construed as limiting.

In an embodiment, the window configuration unit receives content from one or more sources (Step 205). Receiving content may include determining that content from one or more sources is available. For example, the window configuration unit may receive a notification indicating that content from an application, for display within a window on the primary display device, is stored at a particular memory address. The notification may be received from the application associated with the content or from another source (for example, an operating system). The window configuration unit may receive notifications regarding content, stored at multiple storage locations, and associated with multiple content sources. In an example, an application may periodically write image information into memory and notify the window configuration unit of the available image information.

In an embodiment, the window configuration unit may display the content from the memory on the primary display device within one or more windows (Step 210). The window configuration unit may generate an image based on the content to be displayed and write image information for the image into a frame buffer (or video buffer). Generating an image may include determining a display position, size, display layer, transparency, contrast, brightness, number of colors, or other window characteristics for each window to be displayed. In an example, the window display position and window size for a particular window may be used to identify the portion of a displayed image that will include the particular window and the corresponding content. Content for the particular window may be obtained from memory and written into a portion of the frame buffer that corresponds to the identified portion of the image. Image information, including the content for each window, that is stored in the frame buffer may then be used to render an image for display on the primary display device.

In an embodiment, the current (or initial) window characteristics for windows displayed on the primary display device are transmitted to the remote display device (Step 215). The window characteristics may be transmitted to the remote display device continuously, periodically, or in response to an event. For example, the window characteristics may be transmitted to the remote display device in response to a request received from the remote display device. In another example, the window characteristics may be transmitted to the remote display device in response to receiving a request to open a new window for displaying content.

In an embodiment, one or more initial window characteristics for a window may be received from an application that functions as a content source for that window. For example, a web browsing application may determine the initial size of a window for displaying a web page. In another embodiment, one or more initial window characteristics for a window may be determined by an operating system. Transmitting the window characteristics to the remote display device may include encoding the data comprising the window characteristics and transmitting the encoded data.

In an embodiment, transmitting the window characteristics to the remote display device may include transmitting text which includes the values for different window characteristics. Transmitting the window characteristics may include transmitting visual representations of the windows which indicate the window characteristics. For example, an image which includes the outlines of the windows may indicate the window positions and window sizes.

In an embodiment, transmitting the window characteristics may include transmitting a copy of the image information written into the frame buffer. For example, a copy of the image information may be sent to the remote display device as the image information is being written into the frame buffer. The image information may be compressed using lossless or lossy compression prior to transmission to the remote display device. In an example, multimedia content being displayed on a primary display device may be concurrently encoded for real time transmission to the remote display device.

In an embodiment, a complexity of an image displayed on the primary display device may be reduced prior to sending the image to the remote display device. For example, resolution of the image, details within the image, features of the image may be reduced by the window configuration unit. In an example, an image may be filtered to retain the window boundaries and remove the content within the window boundaries and/or remove background content behind the windows.

In an embodiment, images may be displayed on the primary display device at a particular frame rate and sent to the remote display device at a different and/or reduced frame rate. For example, the primary display device may be refreshed at 60 frames per second. Concurrently with the display on the primary display device, 20 frames per second may be transmitted to the remote display device for display on the remote display device.

In an embodiment, updated window characteristics, corresponding to windows displayed on the primary display device, may be received from the remote display device (Step 220). The updated window characteristics received from the remote display device may include information based on user-selected values for one or more window characteristics. The updated window characteristics may include any set of values for window characteristics received from the remote display device. The updated window characteristics may or may not be different from a current set of window characteristics for windows displayed on the primary display device.

In an embodiment, the updated window characteristics may include a modification to an image that was previously sent to the remote display device. For example, an image comprising visual representations of the windows may be sent to the remote display device in Step 215. In response, a modified image including a change in a position or size of the visual representations, that may reflect user input, may be received from the remote display device.

In an embodiment, updated window characteristics may be continuously received from the remote display device as they are being modified by a user of the remote display device. For example, updated values for a transparency level of a window may be received continuously from the remote display device, where each updated value can correspond to positions on a sliding input bar displayed on the remote display device. The positions on the sliding input bar may be determined in real time as a user is changing the transparency level for a particular window. In another example, updated sets of x and y values for a display position of a window may be continuously received from a cellular phone as a user is moving a visual representation of the window on the cellular phone. In another example, a starting x and y display position and an ending x and y display position may be received from a touch-screen tablet without any intermediate display positions that were selected by the user on the touch-screen tablet.

In an embodiment, window characteristics for all windows displayed on the primary display device may be concurrently received from the remote display device. In an alternative embodiment, window characteristics may be received for windows when the window characteristics have been updated at the remote display device.

In an embodiment, Step 220 may be performed without performing Step 215. A set of window characteristics may be received from a remote display device without previously transmitting a current set of window characteristics to the remote display device. In an example, a user may select a display layer for a particular window by selecting the particular window and selecting the display layer on the remote display device. The selected display layer may be received from the remote display device without sending the current display layer for the particular window to the remote display device.

In an embodiment, the display on the primary display device is updated based on the updated window characteristics (Step 225). The window configuration unit may update a configuration of one or more windows on the primary display device based on the updated window characteristics. For example, the window configuration unit may move a particular window to a new display position indicated by the updated window characteristics. In other examples, the window configuration unit may resize one or more windows, modify the shape of one or more windows, or modify the transparency level of one or more windows.

In an embodiment, the window configuration unit may select an audio track based on the updated window characteristics. For example, the updated window characteristics may identify a particular window as the active window and an audio track associated with the content displayed in the active window may be played.

Figure 2B:
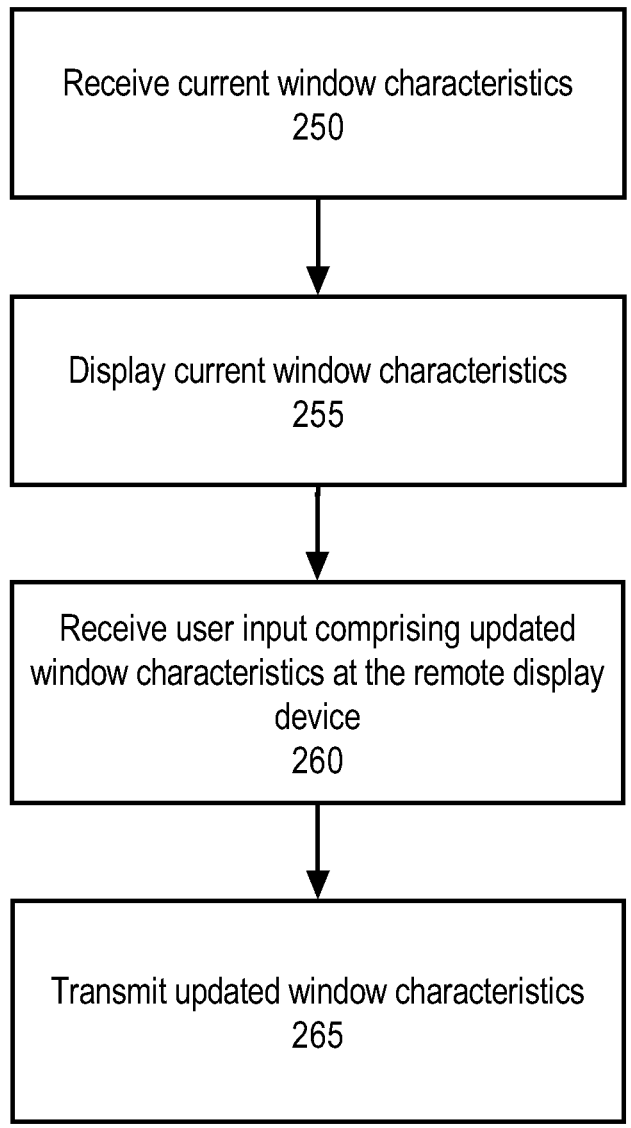

FIG. 2B illustrates an example flow chart for configuring window characteristics, using a remote display device, for windows displayed on a primary display device. Steps shown in FIG. 2B may be rearranged or omitted. Furthermore, additional steps not shown in FIG. 2B may be performed in accordance with one or more embodiments. Accordingly, the selection or arrangement of steps shown in FIG. 2B should not be construed as limiting.

In an embodiment, current window characteristics are received at the remote display device (Step 250). The current window characteristics may be based on a current configuration of windows displayed on a primary display device. The current window characteristics may be received by the remote display device periodically, continuously, or in response to an event. For example, the current window characteristics may be received by the remote display device each time a new window is displayed on the primary display device. In an example, the current window characteristics may be received when a user opens an application on the remote display device for configuring the windows displayed on the primary display device. The application may request the current window characteristics upon initialization.

In an embodiment, receiving the current window characteristics may include receiving encoded or compressed data. The encoded or compressed data may be decoded or decompressed by the remote display device. In an embodiment, real-time decoding may be used to access the current window characteristics as they are received at the remote display device.

In an embodiment, receiving the current window characteristics may include receiving screen shots displayed on a primary display device. The screen shots received at the remote display device may be analyzed to identify the boundaries of windows within the screen shot. Based on the identified boundaries of the windows within the screen shots, the particular values of different window characteristics may be computed by the remote display device. In an embodiment, the analysis of the screen shots may be performed by the window configuration unit and the values of the different window characteristics may be received at the remote display device from the window configuration unit. In an embodiment, screen shots may be received with metadata identifying the windows and the corresponding window characteristics.

In an embodiment, the remote display device displays the current window characteristics (Step 255). The current window characteristics may be displayed in a textual, graphical, or combination textual and graphical format. The current window characteristics may be displayed in the same format in which they were received or may be formatted for display on the remote display device.

In an example, the remote display device may display the same screen shots as displayed on the primary display device. The windows displayed on the primary display device may be displayed on the remote display device using the same aspect ratio as the primary display device, but scaled to the remote display device's display screen. The screen shots may be stretched or shrunk when displayed on the remote display device.

In an embodiment, the remote display device may display the received window characteristics in a first portion of the screen and display additional data in a second portion of the screen. For example, a first portion of the screen on a desktop computer may display images shown on a liquid crystal display. In the example, a second portion of the screen on the desktop computer may display fields or buttons for a user to select windows shown on the liquid crystal display and/or select a size of the windows. In another example, the second portion of the screen on the desktop computer may be used by the user to surf the web or use a different application. Although the examples described above refer to particular devices and particular window characteristics, the examples are applicable to any suitable device or window characteristic.

In an embodiment, user input comprising updated window characteristics may be received at the remote display device (Step 260). For example, a visual representation, of a window displayed on the primary display device, may be modified based on user input received at the remote display device. The visual representation may be modified by a user selecting a new size, a new display position, a new display layer, a new transparency level, etc. for the visual representation. For example, a user may select the visual representation on a touch screen interface of the remote display device and move the visual representation to a new selected display position.

In an embodiment, the remote display device may display a screen divided into multiple sections. User input selecting a particular visual representation and a particular section may be received to move the particular visual representation into the particular section.

In an example, the remote display device may display the window characteristics of a particular window selected from the windows displayed by the primary display device. In addition the remote display device may display the content of the window on the remote display device. User input selecting a number of colors, contrast, a brightness, a shading, a transparency level, size, display position, etc. may be received from a user for that particular window. The remote display device may be used to individually modify the display characteristics of the particular window without affecting the display characteristics of other windows.

In an example, user input may be received to individually select window characteristics for windows displaying video content. A first user input may be received at the remote display device to select a high display resolution for a first window displayed on the primary display device, where the first window includes an action movie. A second user input may be received at the remote display device to select a low display resolution for a second window displayed on the primary display device, where the second window includes a cartoon.

In another example, a brightness setting of a particular window, displayed on the primary display device, may be adjusted by a user using the remote display device without changing the brightness of other windows displayed on the primary display device. Other examples may involve the adjustment of contrast settings or a number of colors for a particular window displayed on the primary display device.

In an embodiment, updated window characteristics may be transmitted from the remote display device to the window configuration unit (Step 265). For example, in response to a selection of a new display position of an outlined window displayed on the remote display device, the x and y coordinates for the new display position may be transmitted to the window configuration unit. Based on the coordinates received from the remote display device, the window configuration unit may update the display position of a window that is displayed on the primary display device and corresponds to the visual representations displayed on the remote display device.

In an embodiment, updated window characteristics may be transmitted in real-time as the user is modifying, on the remote display device, a configuration of one or more windows displayed on the primary display device. In an embodiment, updated window characteristics may be transmitted after a user has finished modifying a configuration of one or more windows. For example, the updated window characteristics may be transmitted in response to receiving confirmation from that the user has finished modifying the configuration of one or more windows.

4.0 Window Configuration Examples

FIGS. 3A-3C and 4A-4B illustrate examples in accordance with one or more embodiments. These examples may skip one or more elements in one or more embodiments for the purpose of clarity and understanding. Furthermore, these examples may include details that may not be necessary when implementing one or more embodiments. Accordingly, these examples should not be construed as limiting in scope.

In an example, FIG. 3A illustrates a display screen (310) on a primary display device (305). The display screen (310) includes window A (315) and window B (320). Window A (315), shown at an initial display position, includes frames in a content stream for a baseball game. Window B (320) displays a web browsing application used by a user for online shopping.

Concurrently with the display of window A (315) and window B (320) on the display screen (310) on the primary display device (305), remote display device (355), after receiving window characteristics for window A (315) and window B (320) from, e.g. a window configuration unit at primary display device (305), displays visual representations of window A (315) and window B (320). In this example, the visual representations include an outline A (365) and an outline B (370) displayed on the window control interface (360). Although outlines are used as visual representations of the windows in this example, any visual representation of a window may be used (for example, an image of the window itself and its contents, an icon, a low resolution image of the window and its contents, a live view (e.g., real time, near-real time, etc.) of the window and its contents, a low resolution live view of the window and its contents, etc.).

The window control interface (360) may be a component of a program installed on the remote display device (355). For example, the program may be downloaded onto the remote display device (355) from a vendor sever, a third party site, a service, etc. The program can be started on the remote display device (355) to control windows displayed on the primary display device (305).

The remote display device (355) initially shows outline A (365) at an initial position Ai that is based on the initial position of window A (315) displayed on display screen (310). In this example, the remote display device (355) detects a user touching window control interface (360) at position Ai to select outline A (365) and sliding along the window control interface (360) to position Af. In response to detecting the user's sliding contact with window control interface (360), remote display device (355) determines that the new display coordinates have been selected for outline A (365) by the user. Specifically, outline A (365), which is a representation of window A (315), was moved from an initial display position Ai to a final display position Af.

Figure 3C:
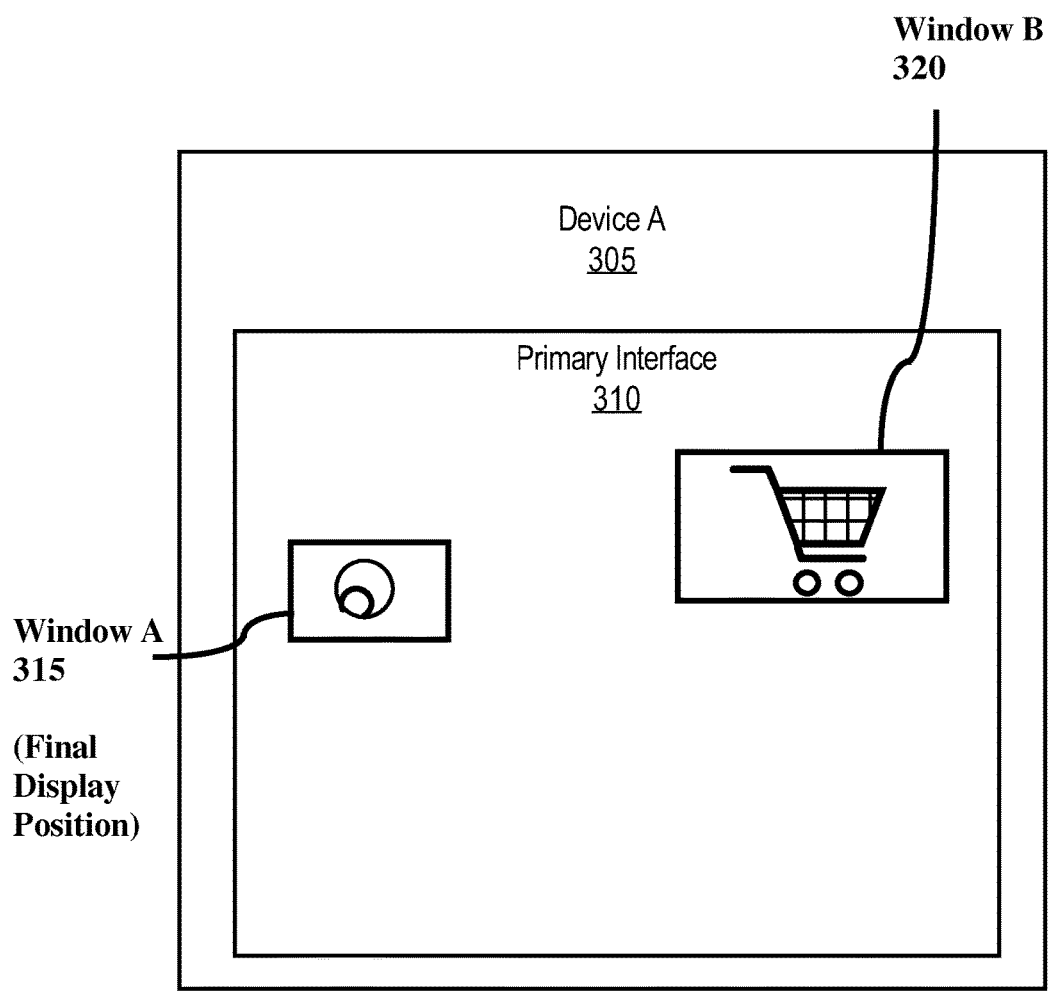

In this example, the remote display device (355) then determines the coordinates of display position Af and transmits the coordinates to primary display device (305). In response to receiving the coordinates, primary display device (305) moves window A (315) from the initial display position Ai to a final display position Af, as shown in FIG. 3C.

The remote display device (355) may also transmit intermediate coordinates for display positions between the initial display position Ai and the final display position Af. The primary display device (305) may display window A (315) at intermediate positions between the initial display position Ai and the final display position Af. For example, as a user is moving outline A (365) on the window control interface (360), the display of the primary interface (310) is updated in real-time to show the movement of window A (315).

The display position of window B (320) remains the same since the visual representation of device B (for example, outline B (370)) was not moved by the user on remote display device (355).

Figure 4A:
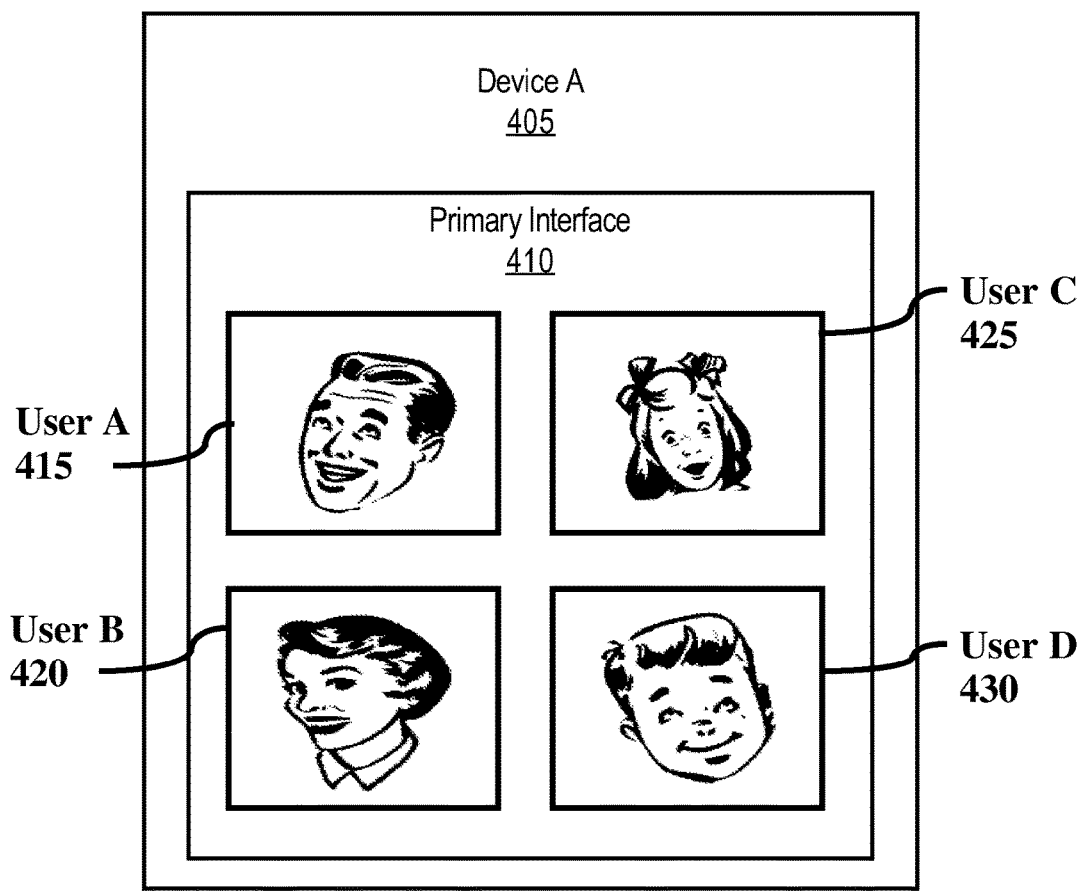
FIGS. 4A-4B illustrate an example of using a remote display device in accordance with one or more embodiments.
Figure 4B:
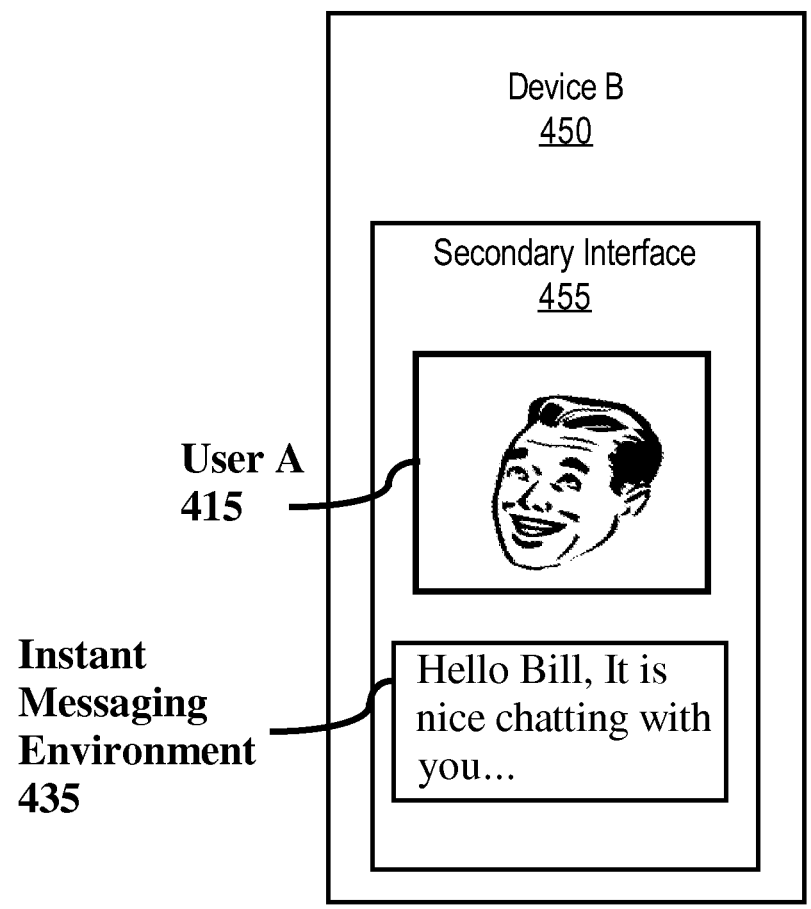

In another example, FIG. 4A and FIG. 4B illustrate a use of a remote display device in accordance with one or more embodiments. FIG. 4A illustrates a primary interface (410) on device A (405). The primary interface (410) is used by a current user to video conference/chat with four other users (for example, user A (415), user B (420), user C (425), and user D (430)).

In addition to using device A (405) with the display of the four other users on the primary interface (410), the current user concurrently uses device B (450). The secondary interface (455) of device B (450) may initially display a list of the four other users displayed on the primary interface (410). Data representing the list may be sent by device A (405), or a separate window configuration unit or source, and received by device B (450). The secondary interface (455) may then receive a user input indicating selection of user A (415) from the list of the four other users. In response to receiving the selection of user A (415), the secondary interface (455) initiates a private video conference between a current user of device B (450) and user A (415), as illustrated in FIG. 4B. Device B (450) may receive the same video feed associated with user A (415) that was received by device A (405) from, e.g., device A (405), a separate window configuration unit, a video feed source, etc. In addition to the video feed, device B (450) may provide an instant messaging environment (435) to exchange instant messages with user A (415), e.g., via an instant messaging server, via an instant messaging proxy, etc.

5.0 Example Embodiments

In an embodiment, a method includes: displaying, at a remote display device, one or more window characteristics of at least one window displayed on a primary display device; receiving, at the remote display device, input to modify the one or more window characteristics of the at least one window displayed on the primary display device; and transmitting, from the remote display device to the primary display device, the one or more modified window characteristics for the at least one window displayed on the primary display device.

In an embodiment, a method includes: displaying, on a primary display device, content in a plurality of windows associated with corresponding window characteristics; transmitting the window characteristics to a remote display device; receiving, from the remote display device, updated window characteristics; and updating the display on the primary display device based on the updated window characteristics.

6.0 Hardware Overview

Figure 5:
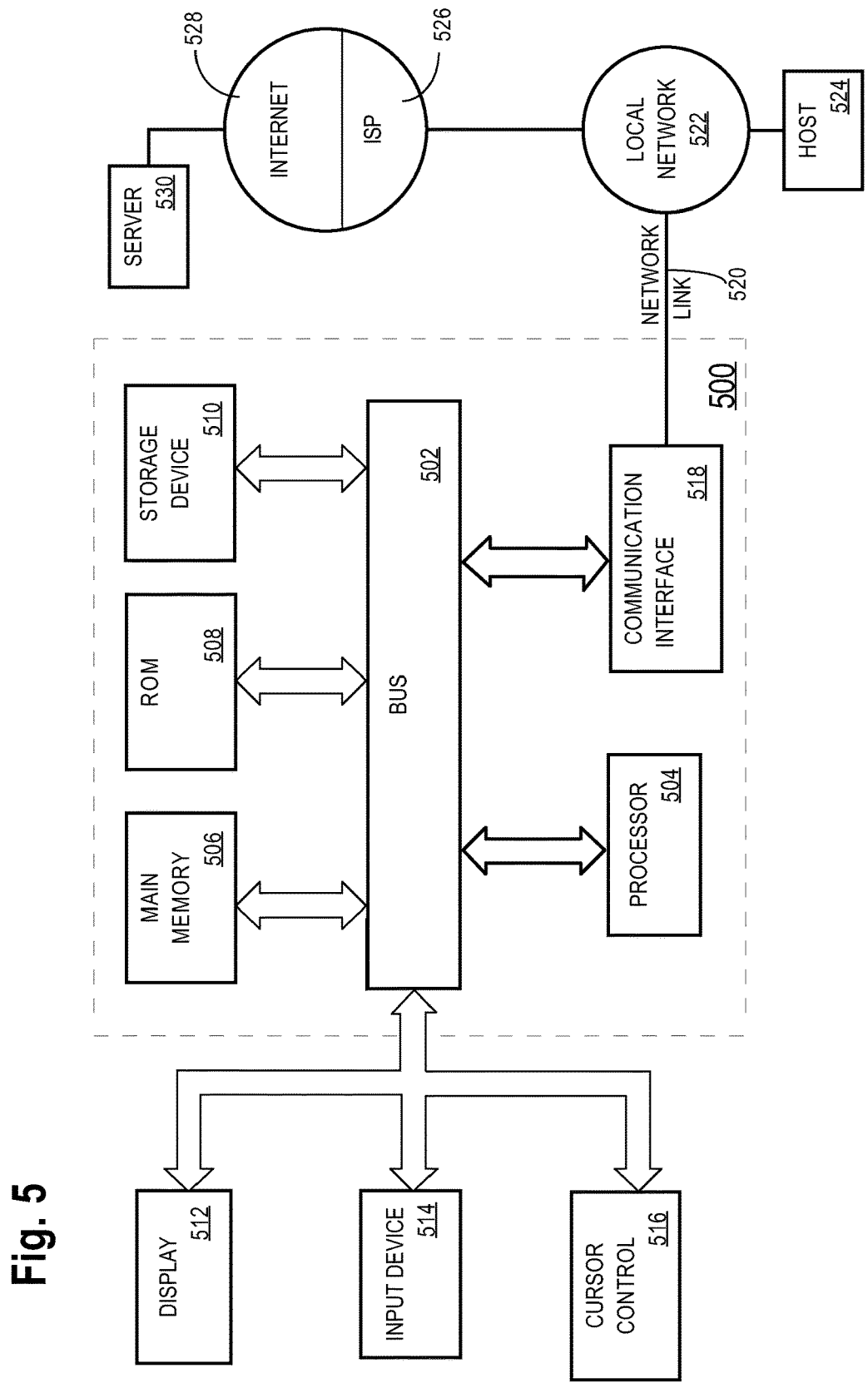
FIG. 5 shows a block diagram that illustrates a system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for a window configuration unit. According to one embodiment of the invention, the window configuration unit is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multiprocessing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a remote display device as described herein.

The received code may be executed by processor 504 as it is received, and/or stored in storage device 510, or other non-volatile storage for later execution. In this manner, computer system 500 may obtain application code in the form of a carrier wave.

7.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

The invention claimed is:

1. A method comprising:

receiving, by a remote display device via a network connection, position information of a plurality of windows being simultaneously displayed on a primary display device, a first of the windows comprising first content received from a first remote source, and a second of the windows comprising second content received from a second remote source;

receiving, by the remote display device via the network connection, a plurality of window characteristics for the plurality of windows, wherein the window characteristics comprise window contrast or window brightness;

generating for display, at the remote display device, a visual representation of the windows displayed on the primary display device based on the position information and the window characteristics;

generating for display, at the remote display device, a textual display of the window characteristics;

receiving, by the remote display device, a first input associated with repositioning the first window relative to the second window for causing the simultaneously displayed windows to be repositioned on the primary device;

receiving, by the remote display device, a second input associated with a modification of one or more of the displayed window characteristics; and sending, by the remote display device via the network connection, data representing the first input and the second input, the data transforming the display positions and characteristics of the windows on the primary display device.

2. The method as recited in claim 1, wherein generating for display the visual representation further comprises:

displaying an outline of the first window being displayed on the primary display device scaled to a different size with a same aspect ratio as on the primary display device.

3. The method as recited in claim 1, wherein the display of the window characteristics further comprises a graphical display of the window characteristics.

4. A method comprising:

generating for simultaneous display, on a primary display device, a plurality of windows, a first of the windows comprising first content received from a first remote source, and a second of the windows comprising second content received from a second remote source;

sending, via a network connection, for display at a remote display device, a visual representation of the plurality of windows displayed on the primary display device, the visual representation reflective of metadata representing position information of the windows, to the remote display device;

sending, via the network connection, textual descriptions of a plurality of window characteristics for the plurality of windows to the remote display device for display, wherein the window characteristics comprise window contrast or window brightness;

receiving, from the remote display device, updated data values associated with repositioning of the windows and modifying the window characteristics; and updating the display positions of the windows and the window characteristics on the primary display device based on the updated data values.

5. The method as recited in claim 4, wherein receiving updated data values comprises receiving the data values for the positions of the windows and the window characteristics that were modified by a user at the remote display device.

6. A non-transitory computer readable medium storing instructions, which when executed by one or more processors causes performance of:

receiving, by a remote display device via a network connection, position information of a plurality of windows being simultaneously displayed on a primary display device, a first of the windows comprising first content received from a first remote source, and a second of the windows comprising second content received from a second remote source;

receiving, by the remote display device via the network connection, a plurality of window characteristics for the plurality of windows, wherein the window characteristics comprise window contrast or window brightness;

generating for display, at the remote display device, a visual representation of the windows displayed on the primary display device based on the position information and the window characteristics;

generating for display, at the remote display device, a textual display of the window characteristics;

receiving, by the remote display device, a first input associated with repositioning the first window relative to the second window for causing the simultaneously displayed windows to be repositioned on the primary device;

receiving, by the remote display device, a second input associated with a modification of one or more of the displayed window characteristics; and sending, by the remote display device via the network connection, data representing the first input and the second input, the data transforming the display positions and characteristics of the windows on the primary display device.

7. The non-transitory computer readable medium as recited in claim 6, wherein generating for display the visual representation further comprises:

displaying an outline of the first window being displayed on the primary display device scaled to a different size with a same aspect ratio as on the primary display device.

8. The non-transitory computer readable storage medium as recited in claim 6, wherein the display of the window characteristics further comprises a graphical display of the window characteristics.

9. A non-transitory computer readable medium storing instructions, which when executed by one or more processors causes performance of:

generating for simultaneous display, on a primary display device, a plurality of windows, a first of the windows comprising first content received from a first remote source, and a second of the windows comprising second content received from a second remote source;

sending, via a network connection, for display at a remote display device, a visual representation of the plurality of windows displayed on the primary display device, the visual representation reflective of metadata representing position information of the windows, to the remote display device;

sending, via the network connection, textual descriptions of a plurality of window characteristics for the plurality of windows to the remote display device for display, wherein the window characteristics comprise window contrast or window brightness;

receiving, from the remote display device, updated data values associated with repositioning of the windows and modifying the window characteristics; and updating the display positions of the windows and the window characteristics on the primary display device based on the updated data values.

10. The non-transitory computer readable medium as recited in claim 9, wherein receiving updated data values comprises receiving the data values for the positions of the windows and the window characteristics that were modified by a user at the remote display device.

11. An apparatus comprising:

one or more processors;

a data receiver at a remote display device that receives, via a network connection, position information of a plurality of windows being simultaneously displayed on a primary display device, a first of the windows comprising first content received from a first remote source, and a second of the windows comprising second content received from a second remote source, wherein the data receiver also receives via the network connection, a plurality of window characteristics for the plurality of windows, wherein the window characteristics comprise window contrast or window brightness;

a display generator at the remote display device that generates for display a visual representation of the windows displayed on the primary display device based on the position information and the window characteristics, and further generates for display a textual display of the window characteristics;

an input receiver at the remote display device, that receives a first input associated with repositioning the first window relative to the second window for causing the simultaneously displayed windows to be repositioned on the primary device and a second input associated with a modification of the one or more of the displayed window characteristics; and a data sender at the remote display device, that sends, from the remote display device via the network connection, data representing the first input and the second input, the data transforming the display positions and characteristics of the windows on the primary display device.

12. The apparatus as recited in claim 11, wherein the display generator generates for display the visual representation comprising an outline of the first window scaled to a different size with a same aspect ratio as on the primary display device.

13. The apparatus as recited in claim 11, wherein the display of the window characteristics further comprises a graphical display of the window characteristics.

14. An apparatus comprising:
one or more processors;
a display generator at a primary display device, that generates for display a plurality of windows, a first of the windows comprising first content received from a first remote source, and a second of the windows comprising second content received from a second remote source;

a data sender that sends, via a network connection, for display at a remote display device, a visual representation of the plurality of windows displayed on the primary display device, the visual representation reflective of metadata representing position information of the windows, to the remote display device, wherein the data sender further sends, via the network connection, textual descriptions of a plurality of window characteristics for the plurality of windows to the remote display device for display, wherein the window characteristics comprise window contrast or window brightness;

a data receiver that receives, from the remote display device, updated data values associated with repositioning of the windows and modifying the window characteristics; and a display updater at the primary display device, that updates the display positions and the window characteristics of the windows on the primary display device based on the updated data values.

15. The apparatus as recited in claim 14, wherein the data receiver receives the data values for the positions of the windows and the window characteristics that were modified by a user at the remote display device.

* * * * *